March 29, 1949. K. H. ENGEL 2,465,716
ISOLATION OF STYRENE BY AZEOTROPIC DISTILLATION
WITH DIMETHYLAMINO ETHANOL
Filed Jan. 22, 1946
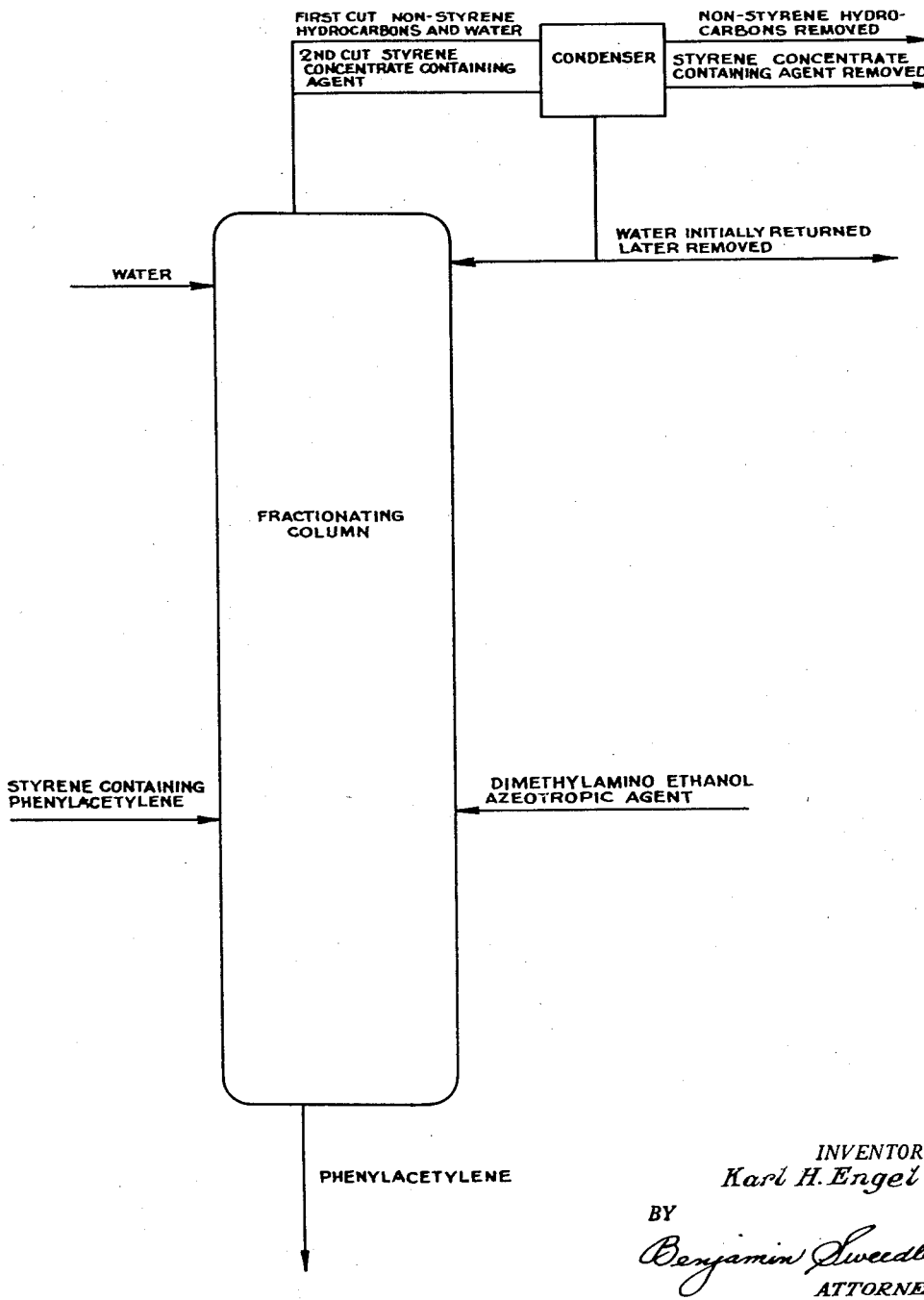
INVENTOR.
Karl H. Engel
BY
Benjamin Sweedler
ATTORNEY Patented Mar. 29, 1949

2,465,716

UNITED STATES PATENT OFFICE 2,465,716

ISOLATION OF STYRENE BY AZEOTROPIC DISTILLATION WITH DIMETHYLAMINO ETHANOL

Karl H. Engel, Teaneck, N. J., assignor to Allied Chemical & Dye Corporation, New York, N. Y., a corporation of New York Application January 22, 1946, Serial No. 642,751

19 Claims. (Cl. 202—42)

This invention relates to the production of substantially pure styrene or a hydrocarbon oil of high styrene content from hydrocarbon oils of relatively low styrene content.

Styrene is found in low concentration in hydrocarbon oils, particularly aromatic hydrocarbon oils, produced in such operations as coal distillation, gas production, and petroleum cracking and reforming. An aromatic hydrocarbon oil containing varying proportions of styrene in admixture with other aromatic hydrocarbons is also obtained when styrene is produced synthetically, e. g., by cracking or dehydrogenation of alkyl benzenes. From these hydrocarbon oils, styrene cuts may be obtained by fractional distillation, which cuts may contain as much as about 50% styrene, the remainder consisting chiefly of like-boiling aromatic hydrocarbons such as the xylenes and ethylbenzene, and sometimes also minor amounts of aliphatic and naphthenic hydrocarbons boiling close to styrene; the styrene oils thus produced generally contain phenylacetylene admixed therewith. Phenylacetylene, as is well known, interferes with proper polymerization of styrene and is, accordingly, undesirable in styrene that is to be used for the production of polymerized products, e. g. resins.

As above indicated, styrene cannot be readily separated from the close-boiling hydrocarbons, including phenylacetylene, with which it is generally associated by ordinary fractional distillation. Although some concentration of phenylacetylene in the overhead product is effected, sufficient is left in the styrene bottoms to give poor polymerization qualities to the styrene; moreover, the yield of monomeric styrene from such separation is poor. It has been proposed heretofore to recover substantially pure styrene by bringing about polymerization of the styrene in the styrene oil, separating the non-styrene components from the polymerized styrene by distillation, and then cracking the polystyrene by application of heat, whereupon a substantial part of the polystyrene depolymerizes to form monomeric styrene. As this process has generally been carried out in the published prior art, the yield of monomeric styrene has been low, and a styrene product is produced in which the styrene is still admixed with close-boiling hydrocarbons.

It has also been proposed to remove phenylacetylene from a styrene oil by chemical means, for example, by treatment with an ammoniacal cuprous or silver salt. Such methods are disadvantageous for economic reasons, both because of the cost of the reagents used and the cost of handling of the styrene oil needed to accomplish removal of the acetylenic constituents.

It is an object of this invention to provide a distillation process for separating styrene in good yield from the oils in which it occurs.

It is a further object of this invention to provide a process in which substantially pure styrene may be obtained in a single distillation operation from the usual styrene fractions which may contain, for example, about 50 wt. percent styrene, obtained by fractional distillation of styrene-containing oils produced in coke-oven operations, water-gas and oil-gas production, the cracking and reforming of petroleum oils, and styrene synthesis.

It is another object of the invention to provide a process for the recovery of styrene from aromatic oils containing styrene and close-boiling benzene homologs such as ortho-xylene, meta-xylene and para-xylene.

It is a further object of this invention to provide a process in which substantially pure styrene, free from phenylacetylene, may be obtained by distillation from the usual crude styrene fractions which contain styrene in admixture with other hydrocarbons, including phenylacetylene.

I have discovered that substantially pure styrene or a hydrocarbon oil greatly enriched in styrene may be separated from a styrene oil containing styrene, along with hydrocarbons including aromatic hydrocarbons, not readily separable from styrene, by ordinary fractional distillation, by carrying out fractional distillation of a mixture of such styrene oil and dimethylamino ethanol (2-dimethylamino ethanol). The styrene oil fractions subjected to azeotropic distillation may have a boiling range of from 130° to 150° C. at a pressure of 760 mm. of mercury.

The dimethylamino ethanol, I have found, on addition to a styrene oil, as above described, containing other hydrocarbons besides styrene, form azeotropes of a minimum boiling type with the various hydrocarbon constituents of the oil; i. e., when a mixture of the hydrocarbon oil and the dimethylamino ethanol is distilled, various hydrocarbon agent mixtures distill over at temperatures lower than the distillation temperatures of the hydrocarbon and of the azeotropic agent forming such mixtures.

Moreover, I have made the surprising discovery that the azeotropic mixtures thus formed between the agent as above described, and the non-styrene hydrocarbons, other than phenylacetylene contained in the styrene oil, have substantially lower distillation temperatures than the azeotropic mixtures of the azeotropic agent and styrene, so that upon fractional distillation of the hydrocarbon-oil azeotropic-agent mixture, the non-styrene components of the oil are distilled off first as azeotropic mixtures with the azeotropic agent, and material whose hydrocarbon component consists of substantially pure styrene or highly enriched styrene may be distilled off as a higher boiling fraction or may be left as still residue when treating an oil substantially free of phenylacetylene.

Thus, when distilling a hydrocarbon oil free of phenylacetylene, in accordance with my invention, an oil consisting of substantially pure styrene may be obtained as the desired product. When a hydrocarbon oil containing phenylacetylene is distilled in accordance with my invention, I have found the non-styrene hydrocarbons, other than phenylacetylene, are distilled off first as azeotropic mixtures with the azeotropic agent hereinabove described, and thereafter the styrene comes off as an azeotropic mixture with the agent, and finally the phenylacetylene. Notwithstanding the fact that phenylacetylene has a lower boiling point than styrene, the azeotropic mixture formed by the agent and styrene, hereinabove described, has a substantially lower distillation temperature than the azeotropic mixture of the agent and phenylacetylene; this difference is sufficiently great so that upon fractional distillation of the agent and styrene oil mixture, substantially all of the styrene is distilled off as an azeotropic mixture with the agent before any phenylacetylene comes off. A material whose hydrocarbon component consists of phenylacetylene may then be distilled off as a higher fraction or may be left as still residue.

Hence, in accordance with my invention, when treating hydrocarbon oils containing phenylacetylene, the oil may be distilled in the presence of the agent, so that in one operation, by careful fractional distillation, there is obtained a styrene fraction which is substantially pure, leaving a still residue of hydrocarbon oil containing phenylacetylene. Alternatively, distillation may be carried out in two operations, the first of which resulting in the separation of the non-styrene oil containing phenylacetylene, and the thus partially purified styrene containing phenylacetylene re-distilled in the presence of the azeotropic agent, hereinabove described, to separate the styrene from the phenylacetylene.

Examples of styrene-containing oils which, as above indicated, may be obtained by fractional distillation of the light aromatic hydrocarbon oils recovered in gas production, coke oven operation, petroleum cracking and reforming, styrene synthesis, or similar operations involving synthesis or pyrolysis of aromatic hydrocarbons containing aliphatic substituents include: (1) drip oil, the oil which settles out from carburetted water-gas or oil-gas mains; (2) the light oils recovered by scrubbing of coke oven gas, carburetted water gas and oil gas; (3) the lower boiling fractions distilled from coal tar, carburetted water-gas tar and oil-gas tar; (4) cracked and reformed petroleum oils; (5) the products of styrene synthesis involving, for example, the pyrolysis of alkyl benzenes; and (6) the products of similar processes involving the synthesis or pyrolysis of aromatic hydrocarbons containing aliphatic substituents, e. g. the product of pyrolysis of a polystyrene resin. From such styrene-containing materials, upon fractional distillation, close-cut fractions boiling, for example, through the range of 140°–146° C., at 760 mm. of mercury pressure, may generally be obtained.

From the first four sources named above, for example, styrene fractions containing up to about 50% styrene by weight are generally obtained; from the other two sources, styrene fractions of higher styrene content may be obtained upon fractional distillation of the original styrene-containing material. Such fractions generally contain varying proportions of styrene, phenylacetylene usually in amount exceeding .05% by weight, substantial proportions of other aromatic hydrocarbons having boiling points close to that of styrene, for example, xylenes, ethylbenzene and other alkyl benzenes, and aliphatic (including naphthenic) hydrocarbons, boiling in the neighborhood of the boiling point of styrene.

The term "like boiling" compounds, with reference to styrene, as used herein, refers to those non-styrene hydrocarbons such as xylenes and ethylbenzene, generally associated with styrene in styrene fractions and to other compounds present in styrene oils which, upon fractional distillation of the oils, tend to distill with the styrene. Styrene fractions produced as above described are, in general, suitable for distillation with the azeotropic agent hereinabove set forth, in accordance with my invention, to produce substantially pure styrene or a hydrocarbon oil greatly enriched in styrene.

It is generally advantageous to subject the styrene crude which is to be azeotropically distilled to preliminary purification. For example, such purification may, particularly in the case of styrene oils recovered from drip oils, light oils, and tar distillates, consist of washing with sulfuric acid followed by neutralization and distillation. Other methods of purifying styrene oils are known in the art. Such purification may be carried out either prior to or following the above-described fractionation to produce a close-cut styrene fraction.

The fractional distillation of azeotropic mixtures of a styrene hydrocarbon oil which may or may not contain phenylacetylene and an azeotropic agent as described above, may be carried out as a simple batch or continuous distillation in which the entire amount of agent needed may be added to the styrene oil before fractionation. Alternatively, the agent may be added gradually in continuous or intermittent fashion during the course of the fractionation. In the latter case, the agent recovered from the distillate during fractionation, as described below, may be returned to the still and an amount of agent may thus be employed in the process substantially less than the total amount supplied to the still during distillation. One method of bringing about continuous recovery of agent from the distillate during fractionation and its return to the still is to have water present in the upper part of the fractionation column, as more fully described below. The water may be looked upon as an auxiliary azeotropic agent in this case.

If the dimethylamino ethanol is added to the styrene oil to be subjected to azeotropic fractionation in a single addition, the amount should be regulated so that there will not be an undue excess remaining in the still residue when fractional distillation is discontinued. If no phenylacetylene is present in the oil, the azeotropic distillation of styrene may be unnecessary. In that case there should be at least sufficient dimethylamino ethanol used to remove substantially all non-styrene hydrocarbons in the azeotropic distillates. If it is desired to separate phenylacetylene from styrene, sufficient dimethylamino ethanol agent must be used to form azeotropic distillates with all hydrocarbons present, a slight excess of agent being desirable in this case to retain phenylacetylene in the still residue. If agent is added intermittently, or if it is cyclically returned to the still, enough agent should be present at all times, for most efficient operation, to form azeotropes with all hydrocarbons held in the fractionating column during operation or in the portion of the column (if water is used as auxiliary agent) in which separation of hydrocarbons from each other is effected.

The azeotropic distillation of the styrene oil which may or may not contain phenylacetylene with the agent, with or without water as an auxiliary agent, may be carried out either batchwise or continuously. In a batchwise fractionation not employing water as auxiliary agent, anhydrous dimethylamino ethanol is preferably used; the distillate at first consists almost entirely of the azeotropic mixture of the agent and non-styrene oil other than phenylacetylene, but as fractionation proceeds and the temperature approaches the distillation temperature of the agent-styrene azeotrope, the styrene content of the distillate gradually increases. However, aqueous mixtures of the agent, which may be available, may be used. When using such aqueous mixtures for most efficient operation of the fractionating column, the water obtained in the first distillation should be removed from the system until substantially anhydrous agent remains in the column and still. The course of the fractionation may be followed by taking samples of the distillate and testing them for their styrene content. When the distillate tests sufficiently high in styrene, the styrene product may then either be withdrawn from the still or taken as a final distillate fraction.

If phenylacetylene is present, the initial fractions are the same as above set forth, and as the fractionation continues to the point where the greater part of the styrene has been distilled over and the temperature of the still approaches the distillation temperature of the agent-phenylacetylene azeotrope, a small proportion of the phenylacetylene may begin to come over with the styrene. The distillation may be stopped at this point, leaving as still residue residual styrene containing phenylacetylene which may be subjected to a separate azeotropic distillation to effect separation of residual styrene from the phenylacetylene.

The course of the fractionation may be followed by taking samples of the distillate and testing them for phenylacetylene. This is done by shaking a small sample with an equal volume of 5% ammoniacal silver nitrate solution and noting the precipitate formed. The distillation is advantageously continued until the phenylacetylene content of the distillate rises to not more than about 0.03% by weight to obtain maximum recovery of styrene and still not have present an objectionable amount of phenylacetylene, such, for example, as would interfere with the subsequent polymerization of the styrene. Preferably, a styrene fraction is isolated, containing substantially less than .03% phenylacetylene.

In continuous operation, the styrene oil and azeotropic agent may be continuously introduced into an intermediate portion of the fractionating column. A product whose oil component is substantially pure styrene, when distilling an oil substantially free of phenylacetylene, or a greatly enriched styrene oil, may be continuously withdrawn from the still and an azeotropic mixture of non-styrene hydrocarbon and agent may be continuously taken off overhead. This distillate may be condensed, the agent separated as described below, and the separated agent returned to the fractionating column along with the entering styrene oil.

When distilling an oil containing phenylacetylene, after separation of hydrocarbons other than phenylacetylene, boiling close to styrene from this oil, a product whose oil component is substantially pure styrene may be continuously taken off overhead in the form of an azeotropic mixture with the agent, and a phenylacetylene concentrate may be continuously withdrawn from the still. The pure styrene containing distillate may be condensed, the agent separated as described below, and the separated agent returned to the fractionating column along with the entering styrene oil.

In batchwise distillation employing water as auxiliary agent, a charge of styrene oil which may or may not contain phenylacetylene, primary agent, namely, dimethylamino ethanol and water is placed in the still and subjected to fractional distillation. Instead of placing the water in the still, it may be added directly to the top of the column. The water forms azeotropes of the so-called eutectic type with the hydrocarbon oils carried upward in the column in azeotropic mixtures with the primary agent. Inasmuch as the water-hydrocarbon azeotropes have lower boiling points than the corresponding primary agent-hydrocarbon azeotropes, the primary agent, in general, is substantially replaced by water. Applied in limited proportions, the water is completely volatilized from the still charge and is eventually found in substantial proportions only in the upper part of the fractionating column and in the distillate. As the distillate is condensed, it stratifies into a water layer and a hydrocarbon layer, generally substantially free from primary agent. The water layer may be continuously returned to the top of the column. In the upper part of the column, therefore, water in the liquid state, along with some condensed hydrocarbon, flows downwardly countercurrent to vapors of water, hydrocarbon and agent passing upwardly through the column; after operation has commenced with addition of a limited amount of water to the still, the water is driven up into the column, leaving anhydrous agent in the still charge.

This water flowing downwardly through the upper part of the column, eventually is again vaporized, its vapors displacing selectively the primary agent vapors in azeotropic mixtures with hydrocarbons in the upper portion of the column, the displaced primary agent vapors in turn being condensed and flowing downward in countercurrent to rising fresh hydrocarbon vapors. Thus, water as well as the primary agent, are completely retained in the still system, and are largely retained in the fractionating column. The quantity of water is determined by the size of the column, the column hold-up and by the proportion of the column which is intended to be operated with the water-azeotrope present therein. By selecting the proper proportion of water to column capacity, water in liquid or vapor phase is confined to generally one-fifth of the column space at the top, the lower four-fifths holding the primary agent as liquid or vapor, a larger column space being required for the more difficult separation of styrene from other hydrocarbons. As in the batchwise distillation above described, distillation is continued until a styrene product of desired purity is obtained, either as still residue or final distillate fraction.

The distillation employing water as auxiliary azeotropic agent may also be carried out continuously by continuously introducing a mixture of the styrene oil, which may or may not contain phenylacetylene, and primary azeotropic agent into an intermediate portion of the fractionating column of a still and column system wherein a mixture of the styrene oil and primary agent is being fractionated; water for the fractionation is introduced continuously or intermittently preferably into the top of the column. As in the batchwise procedure above described, all or the greater part of the water needed for fractionation may be provided by continuous return of the water component of the condensed distillate to the top of the fractionating column.

When distilling an oil containing phenylacetylene, the distillation may be carried out as above described, taking off as distillate first the non-styrene hydrocarbons other than phenylacetylene as an azeotropic mixture with the agent and water, and then substantially all of the styrene as an azeotropic mixture with the agent, leaving as still residue an oil containing substantially all of the phenylacetylene or a mixture of the phenylacetylene and a portion of the styrene may be left as still residue, which is later subjected to a separate azeotropic distillation, as hereinabove described, to separate the styrene from the phenylacetylene.

The degree of fractionation (determined by the number of plates employed in the fractionating column, the point at which batchwise fractionation is discontinued, and the styrene content of the hydrocarbon oil being treated) is controlled so as to give a final product of particular styrene content. I have found it advantageous when subjecting a closecut styrene fraction to azeotropic distillation, as herein described, to continue fractionation until the distillate coming over or the material remaining in the still has at least a 95% styrene content (by weight), based on the oil component of the material. By more exhaustive azeotropic fractionation or refractionation of a styrene-enriched oil, styrene concentrations of 98% to 100% may be obtained.

I have found it advantageous to carry out the distillation at still temperatures not exceeding about 65° C., with correspondingly low vapor pressures not above about 30 mm. of mercury in the system, if no polymerization inhibitor is used. If effective inhibitors are used, such as hydroquinone, phenylhydrazine, hematoxylin, or tertiary butyl catechol, higher temperatures, up to about 100° C. still temperature, and correspondingly higher vapor pressures not exceeding about 100 mm. of mercury may be maintained in the system without appreciable loss of styrene; in the absence of such inhibitors, higher temperatures lead to increasing polymerization of the styrene.

When carrying out the process of my invention in such a way that the oil distillate fractions obtained contain dimethylamino ethanol, i. e. in carrying out distillation without the auxiliary agent, water, the distillate fractions are treated to recover the dimethylamino ethanol.

The dimethylamino ethanol may be recovered from the hydrocarbon oils in which it is dissolved by extraction with an aqueous solution of a mineral acid. For example, the hydrocarbon solution of agent may be agitated with a 10% to 30% solution of sulfuric or hydrochloric acid and the aqueous liquid decanted and treated with an aqueous alkali solution, e. g. an alkali hydroxide or alkali carbonate solution, to spring the organic base, which forms a separate liquid layer.

Alternatively, the agent may advantageously be recovered from the hydrocarbon oils in which it is dissolved by an azeotropic distillation of the agent-hydrocarbon solution with water as the azeotropic agent. This may be carried out by charging the agent-hydrocarbon solution to the still with a relatively small proportion of water and subjecting the mixture to fractional distillation. The early distillate consists of azeotropic mixtures of hydrocarbon and water substantially free of agent, or azeotropic mixtures of hydrocarbon, water and relatively small proportions of agent. This distillate is condensed, whereupon it stratifies into two layers. The lower aqueous layer is continuously returned to the column, whereas the upper hydrocarbon layer is returned only in part, to maintain column equilibrium, the remainder being withdrawn. This is continued until nearly all hydrocarbon has been removed from the still charge. When such a point has been reached, distillation is continued as before, but the water layer is returned to the still. This is continued until the water has been removed. At this point, the still residue consists of practically pure agent, with only a small quantity of hydrocarbon admixed therewith. This residue may be reused directly, or it may be subjected to a simple distillation to obtain a colorless product, and this product may then be employed as primary agent in subsequent azeotropic distillations for separation of styrene.

When treating a phenylacetylene containing oil, the agent may be separated from the still residue consisting of phenylacetylene and agent, as hereinabove described, in connection with recovery of agent from distillate containing same.

As pointed out above, when a sufficiently limited quantity of agent has been used, or when water has been employed as an auxiliary azeotropic agent, as above described, there may be little or no agent remaining in the styrene product, and in these cases, therefore, it is only necessary to treat the non-styrene hydrocarbon oil for removal of agent.

The styrene product may advantageously be subjected to a simple distillation, particularly if it has been withdrawn as still residue rather than final distillate fraction. The styrene may also be agitated with sulfuric acid to remove minute amounts of color bodies, and neutralized with sodium hydroxide prior to said distillation treatment.

The accompanying drawing diagrammatically illustrates the embodiment of the invention involving the separation of styrene and phenylacetylene from a styrene oil containing phenylacetylene and involving the use of water as auxiliary agent. It will be understood the invention is not limited to this embodiment and includes the isolation of styrene from styrene oils free of phenylacetylene and with or without the use of water as auxiliary agent.

The following example is illustrative of my invention; it will be understood the invention is not limited to this example. All percentages in the example are by weight, unless otherwise indicated.

Example

A styrene concentrate of carburetted water gas and coal tar origin was employed. It was prepared by fractionally distilling under reduced pressure the styrene-containing oil previously purified with 5% of its weight of sulfuric acid, 50° Bé. and separately collecting a narrow fraction having the following characteristics:

| | |
|---|---|
| Specific gravity at 25° C | 0.882 |
| Fractional distillation range (5 mm. of mercury) °C | 13.0–15.5 |
| Styrene, percent by volume | 48 |
| Phenylacetylene content per cent | .2 |

The fractionating still was charged with 250 volume parts of the styrene concentrate, 125 volume parts of dimethylamino ethanol (boiling point 135.0° C. at 760 mm. of mercury pressure) and 2 volume parts of a commercial polymerization inhibitor which consists chiefly of hematoxylin. The mixture was carefully fractionated under a pressure of 35 to 40 mm. of mercury.

The ratio of hydrocarbon to agent in the azeotropic distillate, initially about 55 to 45, gradually changed to about 45 to 55. Running samples of the distillate were extracted with dilute mineral acid and water, to remove the agent, the extracted oils were dried and their refractive indices determined; the fractional distillation was continued until the hydrocarbons obtained by extraction of the distillate had a refractive index of 1.541 at 20° C. The still residue was freed from remaining agent by extraction with dilute mineral acid and distilled under reduced pressure of 30 mm. of mercury yielding 43 volume parts of styrene having a refractive index of 1.544 at 20° C., corresponding to approximately 96% styrene.

By distilling this styrene product in the presence of dimethylamino ethanol, a styrene product containing less than .05% phenylacetylene is obtained as distillate.

Since certain changes may be made in carrying out the above process without departing from the scope of the invention, it is intended that all matter contained in the above description shall be interpreted as illustrative and not in a limiting sense.

I claim:

1. In a method for producing a hydrocarbon oil of high styrene content from an oil containing a lower styrene content and at least one like-boiling non-styrene component, the step which comprises fractionally distilling a mixture of such oil and dimethylamino ethanol.

2. In a method for increasing the styrene content of an oil containing styrene and like-boiling hydrocarbons, the steps which comprise adding dimethylamino ethanol to the oil, subjecting this mixture to fractional distillation to separate an azeotropic mixture consisting predominantly of non-styrene hydrocarbons and dimethylamino ethanol, and recovering from the material from which such azeotropic mixture has been separated an oil having a substantially greater styrene content than the original styrene oil.

3. In a method for increasing the styrene content of an oil containing styrene and like-boiling hydrocarbons, including phenylacetylene, the steps which comprise adding dimethylamino ethanol to the oil, subjecting this mixture to fractional distillation to first separate an azeotropic mixture of the non-styrene hydrocarbons other than phenylacetylene and the dimethylamino ethanol, and distilling the material from which such azeotropic mixture has been removed in admixture with dimethylamino ethanol to separate an oil substantially free of phenylacetylene and having a substantially greater styrene content than the original styrene oil.

4. In a method for increasing the styrene content of an oil containing styrene and like-boiling hydrocarbons, including phenylacetylene, the steps which comprise adding dimethylamino ethanol to the oil, and subjecting this mixture to fractional distillation to remove an azeotropic mixture consisting predominantly of the non-styrene hydrocarbons other than phenylacetylene and the dimethylamino ethanol, and leaving as still residue an oil having a substantially greater styrene content than the original styrene oil, and containing substantially all of the phenylacetylene.

5. In a method for increasing the styrene content of an oil containing styrene and like-boiling hydrocarbons, the step which comprises fractionally distilling a mixture of such oil and dimethylamino ethanol.

6. In a method for increasing the styrene content of an oil containing styrene and like-boiling non-styrene components, the steps which comprise adding dimethylamino ethanol to the oil, employed in amount sufficient to form azeotropes with at least a part of the non-styrene components of the oil, subjecting this mixture to fractional distillation to separate as distillate an azeotropic mixture consisting predominantly of the dimethylamino ethanol and non-styrene components, and to produce as a second product a material comprising an oil having a greater styrene content than the original oil, and thereafter removing the dimethylamino ethanol from oil fractions in which it is present.

7. In a method for production of substantially pure styrene from an industrial styrene fraction containing like-boiling non-styrene hydrocarbons the steps which comprise carrying out continuous fractional distillation of a mixture of such styrene fraction and dimethylamino ethanol, said dimethylamino ethanol being present in amount at least sufficient to form azeotropes with the non-styrene hydrocarbons in the oil vaporized, continuously withdrawing as distillate product an azeotropic mixture consisting predominantly of the dimethylamino ethanol and non-styrene hydrocarbons, and continuously withdrawing as residual product a material whose oil component is substantially pure styrene.

8. In a method for increasing the styrene content of an oil containing styrene and like-boiling non-styrene components, the step which comprises carrying out fractional distillation of a mixture of such oil and dimethylamino ethanol, said fractional distillation being carried out in the presence of a styrene polymerization inhibitor and at a temperature of not more than 100° C.

9. In a method for increasing the styrene content of an oil containing styrene and like-boiling non-styrene hydrocarbons, the steps which comprise adding dimethylamino ethanol to the oil, subjecting this mixture to fractional distillation in the presence of water to take off as distillate an azeotropic mixture consisting predominantly of water and non-styrene hydrocarbons, and continuing the distillation until a styrene product of desired purity is produced.

10. In a method for increasing the styrene content of an oil containing styrene and like-boiling non-styrene hydrocarbons, the steps which comprise adding dimethylamino ethanol to the oil, subjecting this mixture to fractional distillation to take off as distillate an azeotropic mixture consisting predominantly of water and non-styrene hydrocarbons, stratifying the distillate into water and hydrocarbon layers and returning the water to the upper part of the fractionating column, continuing fractional distillation, stratification of distillate, and return of water to the column until the greater part of the non-styrene hydrocarbons has been separated from the styrene oil, and thereafter withdrawing as product a styrene oil richer in styrene than the original oil.

11. In a method for increasing the styrene content of an oil containing styrene and like-boiling non-styrene hydrocarbons including phenylacetlyene, the steps which comprise adding water and dimethylamino ethanol to the oil, subjecting this mixture to fractional distillation to take off as distillate an azeotropic mixture consisting predominantly of water and non-styrene hydrocarbons other than phenylacetylene, stratifying the distillate into water and hydrocarbon layers and returning the water to the upper part of the fractionating column, continuing fractional distillation, stratification of the distillate, and return of water into the column until the greater part of the non-styrene hydrocarbons other than phenylacetylene has been separated from the styrene oil, and thereafter withdrawing as product a styrene oil richer in styrene than the original oil, leaving as still residue an oil containing substantially all of the phenylacetylene.

12. In a method for substantially removing phenylacetylene from a styrene oil containing it, the step that comprises fractionally distilling a mixture of such oil and dimethylamino ethanol.

13. In a method for lowering the phenylacetylene content of the styrene oil containing sufficient phenylacetylene to affect polymerization, the step that comprises fractionally distilling a mixture of such oil and dimethylamino ethanol, to separate as distillate product a styrene oil containing an amount of phenylacetylene insufficient to affect polymerization.

14. In a method for lowering the phenylacetylene content of a styrene oil containing at least about .05% phenylacetylene, the step that comprises fractionally distilling a mixture of such oil and dimethylamino ethanol, to separate as distillate product a styrene oil containing less than .03% phenylacetylene.

15. A method for increasing the styrene content of an oil containing styrene and like-boiling hydrocarbons, including phenylacetylene which comprises adding dimethylamino ethanol to the oil, subjecting this mixture to fractional distillation to remove an azeotropic mixture consisting predominantly of the non-styrene hydrocarbons other than phenylacetylene and dimethylamino ethanol, and leaving as still residue an oil having a substantially greater styrene content than the original styrene oil and containing substantially all of the phenylacetylene, and thereafter adding dimethylamino ethanol to the still residue and subjecting this mixture to fractional distillation to separate the styrene from the phenylacetylene.

16. In a process of separating styrene from a styrene oil containing like-boiling non-styrene components involving the distillation of said oil with dimethylamino ethanol to separate an azeotropic mixture of said like-boiling non-styrene components and dimethylamino ethanol, the step which comprises distilling said mixture in the presence of water to separate as distillate an azeotropic mixture of said non-styrene components and water from the dimethylamino ethanol.

17. In the process of separating styrene from a styrene oil containing like-boiling non-styrene aromatic hydrocarbons involving the distillation of said oil with dimethylamino ethanol to separate as distillate an azeotropic mixture of said like-boiling non-styrene aromatic hydrocarbons with dimethylamino ethanol, the step which comprises distilling said mixture in the presence of water to separate an azeotropic mixture of said like-boiling non-styrene aromatic hydrocarbons and water from the dimethylamino ethanol.

18. The process of separating a mixture of dimethylamino ethanol and hydrocarbons which comprises distilling said mixture in the presence of water to distill off an azeotropic mixture of said hydrocarbons with water and thus effect the separation of said hydrocarbons from the dimethylamino ethanol.

19. In a method for increasing the styrene content of an oil containing styrene and like-boiling aromatic hydrocarbons, the step which comprises fractionally distilling a mixture of such oil and dimethylamino ethanol to separate an azeotropic mixture of the like-boiling aromatic hydrocarbons and dimethylamino ethanol from the oil.

KARL H. ENGEL.

REFERENCES CITED

The following references are of record in the file of this patent:

UNITED STATES PATENTS

| Number | Name | Date |
|---|---|---|
| 2,376,870 | Engel | May 29, 1945 |
| 2,380,019 | Bloomer | July 10, 1945 |
| 2,381,996 | Bloomer | Aug. 14, 1945 |
| 2,385,235 | Schneider | Sept. 18, 1945 |
| 2,398,689 | Bloomer | Apr. 16, 1946 |

OTHER REFERENCES

Mair et al.: Bureau of Standards Journal of Research, vol. 27, pages 39–63 (July 1941). Copy in Scientific Library 202–42–L.